(12) United States Patent
Abramczyk et al.

(10) Patent No.: US 7,686,332 B2
(45) Date of Patent: Mar. 30, 2010

(54) INTEGRATED SIDE IMPACT AIR BAG WITH SINGLE LAYER SAIL PANELS

(75) Inventors: William Michael Abramczyk, Rochester Hills, MI (US); Edgardo Valdez, Beverly Hills, MI (US); Karen M. Balavich, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/052,146

(22) Filed: Mar. 20, 2008

(65) Prior Publication Data

US 2009/0236827 A1    Sep. 24, 2009

(51) Int. Cl.
   *B60R 21/16* (2006.01)
(52) U.S. Cl. .................. 280/743.1; 280/730.2

(58) Field of Classification Search .............. 280/743.1, 280/730.2
See application file for complete search history.

(56) References Cited

U.S. PATENT DOCUMENTS

| 7,004,498 | B2 | 2/2006 | Daines et al. |
| 7,571,930 | B2 * | 8/2009 | Osterhout et al. ........ 280/730.2 |
| 2006/0138755 | A1 | 6/2006 | Lockwood |
| 2006/0290122 | A1 | 12/2006 | Woydick |

FOREIGN PATENT DOCUMENTS

JP          2004182026 A  *  7/2004

* cited by examiner

*Primary Examiner*—Faye M. Fleming
(74) *Attorney, Agent, or Firm*—Frank MacKenzie; Ford Global Technologies, LLC

(57) ABSTRACT

A two panel, woven, inflatable air bag with a single panel sail portion, and method of making the same.

8 Claims, 2 Drawing Sheets

US 7,686,332 B2

INTEGRATED SIDE IMPACT AIR BAG WITH SINGLE LAYER SAIL PANELS

TECHNICAL FIELD OF THE INVENTION

The fabric cushion of an air bag is one of the most expensive pieces of the curtain airbag assembly. Front and rear sail panels require additional length of the woven material. There is a need for an air bag that will eliminate many of the issues associated with the fixation of a separate panel of fabric to create a sail panel in an airbag. For bags with woven side panels, there is a need to improve the nesting efficiency of curtain airbags by eliminating the excess fabric while retaining functionality, thus saving cost of material and not affecting function. Additionally, a curtain in its folded stowed state has a certain amount of compressible bulk. Elimination of unnecessary material will reduce the bulk, thereby permitting compression of the air bag with integrated single layer sail panel into more compact storage areas.

Inflatable side curtains have been improved to provide more coverage across the side window opening to enhance ejection mitigation characteristics of the side curtain. The front portion of a front side door translates into a triangular shape as the A pillar of a vehicle, such as an automobile, slopes downward. Usually, the stowed curtain and sail panel (the portion of the curtain that covers the triangular shape) is contained along the roof side rail down the A pillar. Providing coverage for the triangular portion is challenging since the A pillars are minimized so as not to interfere with binocular vision requirements. There is a need for a single layer sail panel that may be cut from the top or bottom layer of the two layer woven bag. The cut piece sail retains the side portions so that the sail panel is hinged and may be folded forward in the vehicle to create the sail portion. This can also be done for rear sail panels. Alternatively this can be done along the full or partial length of the curtain to provide belt line coverage. These and other objects can be understood by reading the summary and detailed description of a preferred embodiment as well as the claims.

SUMMARY OF THE INVENTION

In one embodiment, the present invention includes an improved two panel woven fabric inflatable airbag for use in vehicles with single panel sail portions, comprising a first larger panel of woven fabric and a second smaller panel of woven fabric; said panels fastened together along a perimeter of said smaller panel to form a two panel inflatable air bag with a length having opposed ends and a width having opposed ends; airbag equipped with hinged sail portions formed from portions said larger panel not fastened to said smaller portion. It is contemplated, but not mandatory, that the hinged sail portions may be oriented opposite each other. In other words, in one embodiment the sail portions may be located at opposed ends of airbag length. In another embodiment, at least one sail portion may be located along at least one end of the width of said airbag. However the sail portion is oriented, it is hinged and foldable in a vehicle to create an airbag sail panel that may be stored in a compact area, such as an A pillar.

In another embodiment, the present invention includes an improved, two panel woven fabric inflatable impact airbag for use in vehicles. The air bag may be comprised of a top and bottom panel, each panel having a length and width. The top panel may have an elongated trapezoidal shape and the bottom panel may have a rectangular shape. The panels are fastened together along a periphery of the rectangular panel to form the inflatable air bag. The trapezoidal panel length terminates at a first and second end, each of which is comprised of a single layer sail portion integral with the trapezoidal woven panel to form a two panel woven inflatable air bag with single panel sail portions. Each of the sail portions is hinged and foldable in a vehicle to create sail panels.

In another embodiment, the present invention may include a method to form a two layer woven inflatable impact air bag for use in vehicles. The method comprises forming a two layer woven inflatable air bag having a top panel and a bottom panel having a length and a width and securing the panels together along their lengths to form an inflatable two panel air bag terminating at a first and second end in a single panel hinged, foldable sail portion formed by cutting each said panel from an identical panel of said air bag.

These and other embodiments will become more apparent upon a reading of the following description of the invention review of the drawings and the appended claims.

DETAILED DESCRIPTION OF THE PREFERRED EMBODIMENT(S)

Figure 1:
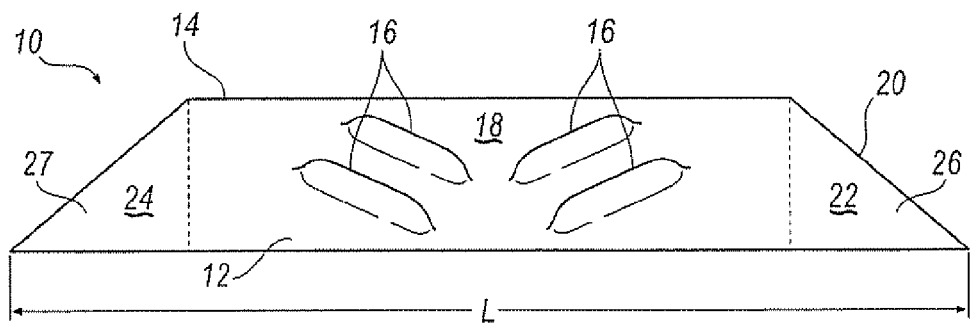
FIG. 1 is a schematic plan view of a conventional two panel woven airbag showing the sail portions on either end of the air bag.

Turning now to the drawings wherein like numbers refer to like structures, and particularly to FIG. 1, conventional two panel air bag 10 is comprises of a first panel 12, a second panel 14 fastened together to form inflatable chambers 16 to make an inflatable air bag 18. In the conventional construction, the panels are of a woven fabric, and may be sewn or otherwise fasted together along a periphery 20 of the air bag. At opposed ends 22 and 24, the conventional air bag terminates in two panel sail portions that fold into a vehicle (not shown) to form a sail panel 26 and 27. The total length of the entire structure is determined at L to be the entire span of the air bag, including the sail portions.

Figure 2:
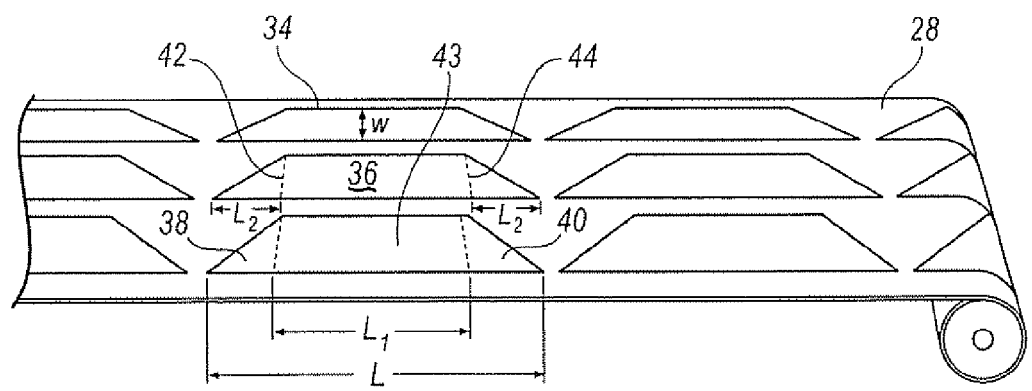
FIG. 2 is a schematic representation of a two panel woven airbag material being formed into two sided airbags with integrated sail portions.
Figure 3:
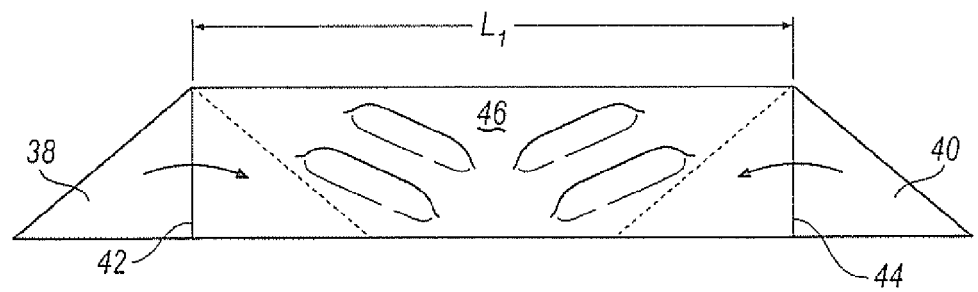
FIG. 3 is a detailed view of a two panel woven airbag showing its length and width with integrated hinged sail portions.

FIG. 2 is a schematic representation of one method of forming the two panel woven, inflatable air bag with single panel sail portions according to the present application. Specifically, fabric 28 is a roll of two panel woven fabric out of which is formed a two panel woven inflatable air bag of one embodiment of the present invention. Specifically, the air bag has a total length L and a width W. The panels are sewn or otherwise fastened together about a periphery 34, such that the fabric panels are fastened together to form at least one inflatable chamber 36. The body 43 has a length of $L_1$ as measured from hinges 42 and 44, with sail panels 38 and 40 extending therefrom. Each sail panel has a length of $L_2$ as measured from the hinges 42 and 41, and there are two sail panels for each air bag, for a total length of the sail panels of $2L_2$. Thus, it can be seen that the total length L of the air bag is comprised of $L_1+2L_2$. The entire inflatable air bag is then cut from the two panels of woven fabric, and one panel, preferably the bottom panel, is cut away at the sail portion so that only the top panel has a sail portion 38, 40, respectively, as seen in FIG. 3, integral therewith. The sail portions so formed are hinged at 42, 44, respectively, so that the sail portion may be easily folded along the hinge against the body of the side impact airbag and the entire airbag can be folded into an automotive compartment, such as an A pillar, as the design needs for such airbags require.

Figure 4:
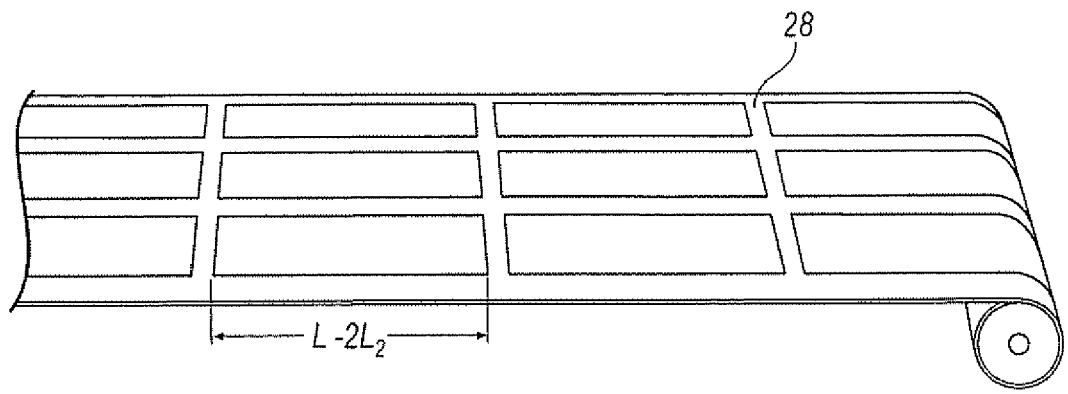
FIG. 4 is a schematic representation of one embodiment of the improved air bag according to the present invention showing the reduced length of the woven airbag.
Figure 5:
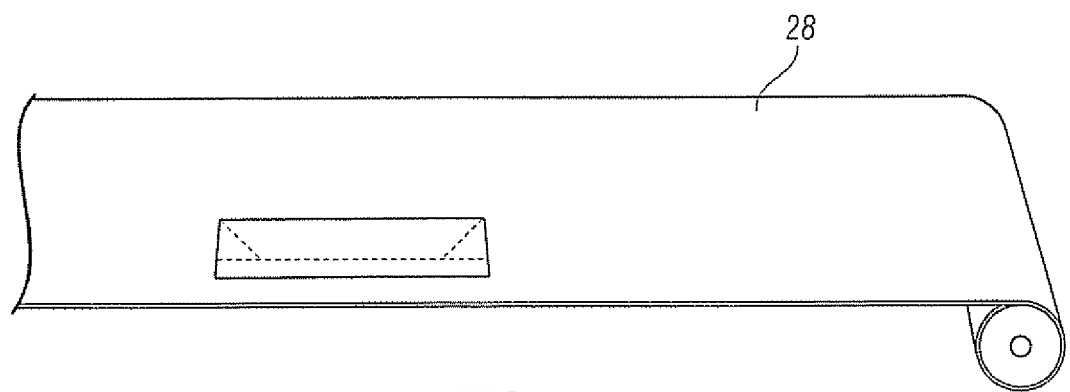
FIG. 5 is a schematic representation of an air bag as shown in FIG. 4, showing the folded sail portions to present a reduced length air bag according to one embodiment of the present invention.
Figure 6:
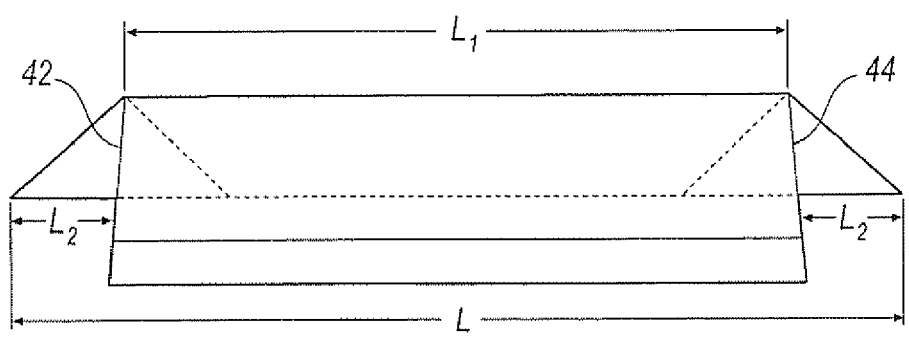
FIG. 6 is a schematic representation of the air bag shown in FIG. 5 cut from the fabric roll and unfolded to show the sail portions unfolded.

Turning to FIG. 3, it can be seen that the air bag formed as described above has hinged sail portions that permit the airbag to be folded at the sail portions so that the length is reduced as the sail portions may be easily folded over the body 46 of the air bag for convenient packaging in the vehicle. The air bag body has a length $L_1$ that is less than the total length L of the air bag as set forth in FIG. 1 because the sail portions may be folded over the body portion to present the reduced length. Thus, the airbag of FIG. 3 has a length $L_1$ that is less than the total length of the airbag as described in FIG. 1 by an amount represented by $2L_2$, which is the length of the two sail portions of the air bag according to one embodiment of the present invention. An air bag so formed offers many advantages. Elimination of secondary sewing operations of cut and sewn sail panels is realized. In addition, as seen in FIG. 4, there is a reduced material usage because the length $L-2L_2=L_1$ of the basic air bag two layer woven material reduced in length in the loom. There is a potential for 20% material savings from utilizing this type of construction. In addition, a better stowed folded air bag package size due to single layer being cut and unfolded forward is realized. This arrangement can save up to about 20% over conventional nesting methods for an air bag within a vehicle compartment. Moreover, there is better nesting relative to bag height that may be achieved by allowing only a single layer at the air bag belt line along the full or partial length of the air bag. FIG. 5 shows the air bag with the sail portions folded at the hinges, and FIG. 6 shows the air bag of FIG. 5, cut from the material and unfolded. The sail portions have a length $L_2$ as measured from hinges 42 and 44, respectively, the body has a length $L_1$, and the sum of $L_1+2L_2=L$, which is the total length of the airbag. This can save up to 20% over conventional nesting methods. Additionally, new single layer cutting methods could be enabled that could remove redundant layers in non inflated areas of the air bag.

The words used in the specification are words of description and not words of limitation. Many variations and modifications are possible without departing form the scope and spirit of the invention as set forth in the appended claims.

What is claimed as new and desired to be protected by Letters Patent of the United States is:

1. An improved two panel woven fabric inflatable airbag with single panel sail portions for use in vehicles, comprising a first larger panel of woven fabric and a second smaller panel of woven fabric; said panels fastened together along a perimeter of said smaller panel to form a two panel woven fabric inflatable air bag with a length having opposed ends and a width having opposed ends; said inflatable airbag equipped with hinged sail portions formed from portions of said larger panel not fastened to said smaller panel at opposed ends of said inflatable airbag length.

2. The improved two panel woven fabric inflatable airbag of claim 1, wherein said hinged sail portions are oriented opposite each other.

3. The improved two panel woven fabric inflatable airbag of claim 1, wherein said sail portions are located at opposed ends of said length.

4. The improved two panel woven fabric inflatable airbag of claim 1, wherein said a sail portion is located along at least one end of the width of said airbag.

5. The improved two panel woven fabric inflatable airbag of claim 1, wherein said sail portion is hinged and foldable in said vehicle to create a sail panel.

6. An improved, two panel woven fabric inflatable impact airbag for use in vehicles, said air bag comprised of a top and bottom panel, each panel having a length and width; a first panel having an elongated trapezoidal shape and a second panel having a rectangular shape and fastened together along a periphery of said rectangular panel to form the inflatable air bag, said trapezoidal panel length terminating at a first and second end, each of said first and second end comprised of a single layer sail portion integral with said trapezoidal woven panel to form a two panel woven inflatable air bag with single panel sail portions.

7. The impact air bag of claim 6, wherein said sail is hinged and foldable in a vehicle to create said sail panel.

8. A method to form a two layer woven inflatable impact air bag for use in vehicles, said method comprising forming a two layer woven inflatable air bag having a top panel and a bottom panel having a length and a width and securing said panels together along said length to form an inflatable two panel air bag, said air bag terminating at a first and second end in a single panel hinged, foldable sail portion formed by cutting each said panel from an identical panel of said air bag.

\* \* \* \* \*